Aug. 25, 1959 M. J. KRAMER ET AL 2,901,701
POWER METERING SYSTEM
Filed Dec. 21, 1956

INVENTORS
Max J. Kramer &
Robert N. Wagner
BY
Howard B. Funk
ATTORNEY

United States Patent Office 2,901,701
Patented Aug. 25, 1959

2,901,701

POWER METERING SYSTEM

Max J. Kramer, Parma, Ohio, and Robert N. Wagner, Pittsburgh, Pa., assignors to Aluminum Company of America, Pittsburgh, Pa., a corporation of Pennsylvania Application December 21, 1956, Serial No. 629,854

4 Claims. (Cl. 324—117)

This invention relates to the metering of direct current power and particularly to the recording of such power by an induction watthour meter.

An object of the invention is to provide a system giving an accurate measurement of average D.C. power, particularly of high amperage power circuits, which is readily adapted to a wide range of power circuits and which is characterized by the utilization of rugged and stable electrical devices having no moving parts except for the armature and totalizing elements of an integrating induction watthour meter.

Heretofore, many and various devices or systems have been developed to measure D.C. electrical energy, but most, if not all, embody operating elements such as commutator or other contact mechanisms, electronic devices, shunts, etc., and therefore, have been subject to the troubles, inaccuracies, power losses and high and constant repair and maintenance needs which are ever present in such systems.

It is known that the standard induction watthour meter is a well developed and readily obtainable integrating meter which is possessed of a very high degree of accuracy and stability. It is a feature of our invention to make use of such a meter in combination with wholly static electrical devices to effect operation thereof from a high amperage D.C. power circuit to measure and record the D.C. power.

Further objects and advantages of the invention, particularly in the kilowatt hour recording of the voltage and current of a D.C. power circuit by an induction watthour meter, will appear from the following description when taken in connection with the accompanying drawing, in which.

Figure 1:
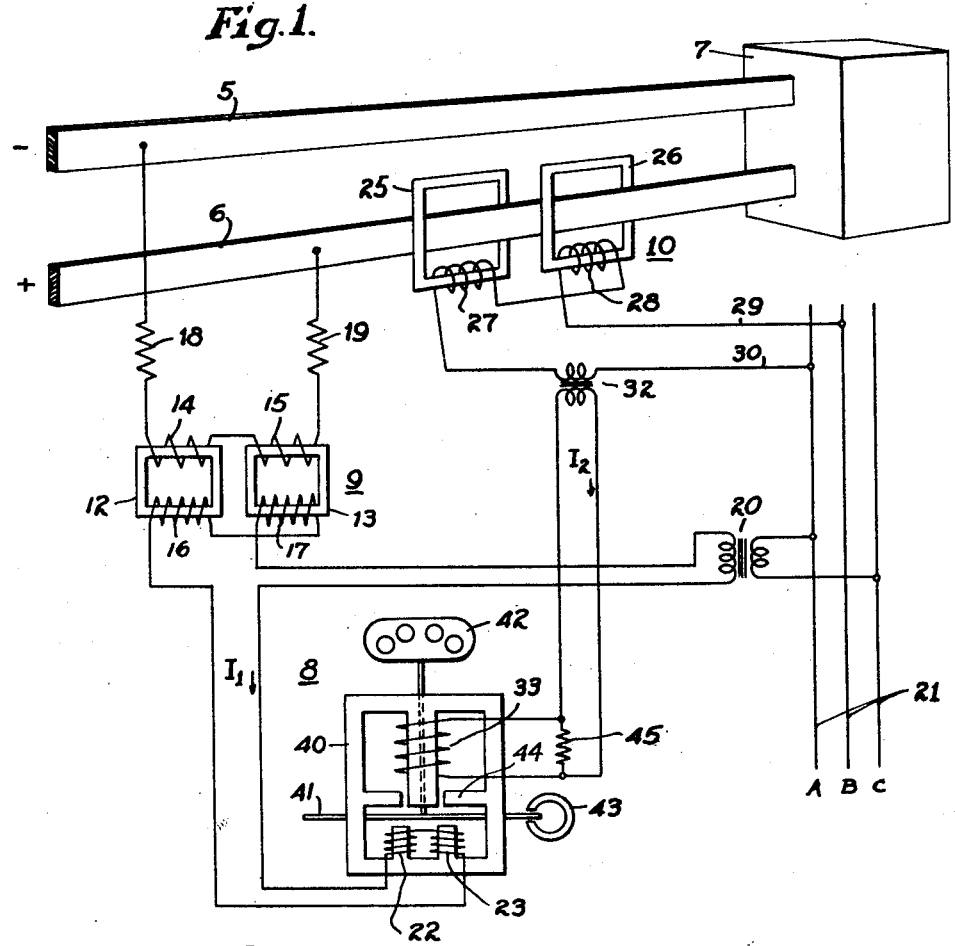
Fig. 1 is a schematic diagram of the elements and circuits of a preferred form of our invention as it is practiced in metering the power delivered for utilization in the electrolytic production of aluminum.

As indicated in Fig. 1, 5 and 6 represent the positive and negative line conductors of a D.C. power feeder or distribution bus which, in the case of electrolytic cell or pot line operation for aluminum production, is adapted to carry high current, medium voltage D.C. power supplied from a suitable source indicated at 7. A typical circuit often is designed to carry as much as 100,000 amperes at 600 volts, and needs to be metered with sustained accuracy. To attain this objective, the system of this invention utilizes an induction watthour meter 8, a voltage transductor 9 and a current transductor 10. The two transductors convert the voltage and current quantities of the D.C. power circuit to proportional alternating current quantities. These are then applied to the meter in proper relation to each other in such manner as to effect accurate integration of their product in terms of D.C. kilowatt hours.

Figure 3:
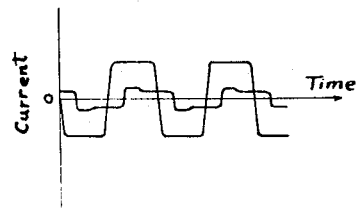
Fig. 3 is a graph representing the magnitude and time relation of the two transductor currents, illustrative of the teachings of the invention.

The voltage transductor 9 comprises a pair of closed magnetic cores 12 and 13 carrying D.C. control windings or coils 14 and 15 and A.C. output windings 16 and 17, respectively. In order that the saturation of the cores by magnetic flux will be varied in accordance with the voltage of the power circuit, control windings 14 and 15 are connected in series across the bus bar line conductors 5 and 6. Current limiting resistors 18 and 19 are inserted in the connecting leads of this series circuit and the resistors may be lumped together, if desired, just so only a small portion of the line voltage will appear across the control windings, thereby to limit the exciting current ampere turns. The A.C. output windings are connected in opposition or reverse polarity, as shown, in order to develop opposed fluxes in the cores and thus produce opposite magnetizing effects thereon, as is normally the case in the operation of transductors. These coils are connected to be energized from the secondary winding of transformer 20 whose primary winding is connected across one phase of 3 phase A.C. supply source 21, which may suitably be a 440 volt-60 cycle, 3 phase source, as shown. The energizing circuit of coils 16 and 17 extends from one side of the secondary winding of transformer 20, through the coils 16 and 17, in series, through series coils 22 and 23 of meter 8 to the other side of the secondary winding of transformer 20. It is required that coils 16 and 17 be connected in series in order that the alternating current $I_1$, that flows in this circuit will be essentially a series of positive and negative polarity rectangular pulses, as illustrated in Fig. 3. The magnitude of this output current is nearly the D.C. flowing in control windings 14 and 15 times the ratio of the D.C. turns to the A.C. turns and varies proportionally with variations of the D.C. power line voltage.

The current transductor 10, likewise, comprises two closed magnetic cores 25 and 26, both of which have a D.C. winding constituted by one of the line conductors of the D.C. power circuit, so that their magnetic saturation will vary in accordance with the magnitude of current flow through that line conductor. As illustrated, both cores are disposed in inductive relation with line conductor 6 and this conductor constitutes a single turn control winding for the cores 25 and 26 and provides the D.C. flux which passes through them. These cores carry A.C. windings or coils 27 and 28, respectively, which are connected in opposition, to produce opposite magnetizing effects thereon, and across another phase of the A.C. supply source 21, through leads 29 and 30. Distributed windings around the cores will preferably be used, instead of the single windings shown, with the number of turns dependent upon the magnitude of the D.C. flow in the line conductor 6 and a reasonable valve of A.C. flow in the output circuit. A current transformer 32 is connected in the lead 30 to supply current $I_2$ to a load current winding 33 of meter 8 proportional to the output current of transductor 10. The transformers 20 and 32 are effective to eliminate high voltages between the meter windings and the meter parts and to make calibration easier. As was the case with the windings 16 and 17 of the voltage transductor, the windings 27 and 28 of the current transductor are connected in series in order that the alternating current $I_2$ that flows through the meter load coil 33 will be essentially a series of positive and negative polarity rectangular pulses, as illustrated in Fig. 3. The magnitude of this current $I_2$ varies proportionally with variations of the direct current flow through the power line conductor 6.

The meter 8 is essentially a standard single phase induction watthour meter having the usual electromagnetic core 40, armature disc and shaft 41, register 42 and the disc drag or damping magnet 43. To accommodate it to the outputs of the voltage and current transductors, which are milliamperes and amperes, respectively, the coils 22—23 and 33 replace the usual current and potential coils of the meter. The series coils 22—23 are wound to carry the milliampere current $I_1$ and are disposed on the two laterally spaced polar projections on the core 40 below the disc, while load coil 33 is wound of heavy wire to carry the ampere or load current $I_2$ and its replaces the usual potential coil on the central pole of core 40 above the disc.

Operating advantages result from the upper winding of the watthour meter being changed from potential input to current input. The large current transductor 10 has the power to stand the inductive loading imposed on it by the upper coil and provide a substantially linear output, whereas the output of the small voltage transductor 9 would be influenced by this load and would therefore have a non-linear output with the D.C. voltage. In addition, the usual magnetic shunt projections 44 of the electromagnetic core 40 for the upper magnetic circuit can remain intact and use of a shunting resistor for the upper coil becomes possible. Such resistor decreases the voltage burden on the upper coil and allows such coil to assume its desired phase relation with the total current supplied from the current transductor output circuit and produce a faster rotational speed of the meter disc. By providing the meter with lower coils rewound to have more turns than the usual lower coils, for input from the small voltage transductor, sufficient ampere turns are developed to drive the meter disc with a low volt burden, because the circuit is not so inductive and because the current therein is milliamperes.

Moreover, we have found the upper load winding may comprise two separate windings, each to operate from a different current transductor to totalize the power from two sources of D.C., where these two sources feed into a common bus and therefore require only a single volt transductor. In such case, the two current transductors will be smaller and cheaper than a single large one, thus effecting a cost saving.

Each of the alternating currents $I_1$ and $I_2$ produces flux which passes through the disc and cause eddy currents to be induced therein which flow about the corresponding poles in the general form of concentric circles. Interaction of each induced current with the flux which does not produce it results in producing torque on the disc. From this, it follows that the two currents must be displaced with respect to each other, since if they are in-phase the torque on the disc will be zero. Hence, in order to effect operation of the meter, it is essential to provide a definite and substantially constant phase displacement between the meter operating currents, and one that will give a reasonably rapid disc speed at full load excitation of the meter coils.

Figure 2:
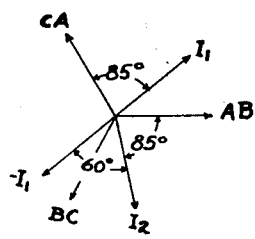
Fig. 2 is a vector diagram showing phase shift of two transductor currents employed in effecting meter operation.

Since the current $I_1$ and $I_2$ are supplied through the transductors 9 and 10, respectively, the phase angle between them is determined by the respective transductor circuits and both lag the source voltage by nearly the same amount. If both transductors use the same voltage source, both milliampere and ampere inputs to the watthour meter will have a fixed phase angle, but will also be substantially in-phase and hence fail to produce meter torque. To obtain a definite and effective phase shift between these two currents, various expedients may be employed, such as using a resistor and inductance to feed the voltage transductor from the same source voltage that supplies the current transductor. However, the extra cost this introduces may simply be avoided. As hereinabove mentioned, the two transductors are energized from different phases such as AB and CA of the three phase A.C. source 21, thereby utilizing the shift in the phase angle which such source makes available. As a result, this produces about 60° between $I_1$ and $I_2$, as shown in Fig. 2, and thereby causes the current pulses in the meter coils to be correspondingly displaced on the time axis, as indicated in Fig. 3. This represents a meter power factor of about .500 which is definite and substantially constant and enables production of effective disc driving torque by the currents circulating through the meter windings. We have found that shunting a resistor 45 across the highly inductive ampere coil 33 will increase the disc speed, within limits. This is brought about by reason of the coil amperes lagging the resistor amperes, although the total amperes is not affected. The coil amperes is somewhat reduced, but it is peculiar that the effects of this is overcome by the gain in power factor, so the disc runs faster. This has been found to be so within certain limits, since a wide variation in the ohmic value of the resistor produces no variation is disc speed. Apparently, the change in coil amperes is balanced by an exact reverse change in meter power factor.

As a result of the meter operating currents being held in a substantially constant and definite phase displaced relation with respect to each other, the meter is practically rendered responsive solely to the voltage and current values of the D.C. power circuit, as converted by the two transductors to proportional alternating currents to give a very accurate integration of the average power delivered by the D.C. power line. Under a given condition of voltage and current of the D.C. power circuit, the meter disc will rotate at a definite speed and integrate the product of voltage times current. The total number of revolutions of the meter disc over any given period will be proportional to the D.C. energy in watthours. Should either the voltage or current of the power circuit vary, it will be reflected by a proportional change in the current $I_1$ of the voltage transductor or the current $I_2$ of the current transductor, as the case may be, thereby causing the meter speed to change proportionally. In this way, an accurate record of the average power delivered by the D.C. power circuit is attained and the difficulties arising from the use of D.C. type watthour meters and shunts and such like are avoided. The system of this invention, therefore, not only is characterized by the simplicity and stability of its components and circuits, but by its sustained accuracy and reliability in measuring and recording D.C. power.

What is claimed is:

1. A system for measuring and totalizing the power delivered through two line conductors of a direct current power circuit comprising an induction watthour meter having its potential and current windings replaced by an ampere winding and a milliampere winding which are wound to adapt them to the output currents of the two transductors hereinafter specified and a rotatable disc armature connected to a register and adapted to be driven by torque developed thereon by phase displaced currents flowing through said windings, a voltage transductor comprising two closed magnetic cores, a direct current control winding on each core connected in series with each other and across said two line conductors so as to be responsive to the D.C. voltage thereacross, an A.C. winding on each of said cores connected with each other in reverse polarity and in series circuit relation, a polyphase A.C. supply source, a circuit connecting said A.C. windings and said milliampere meter winding in series circuit relation across one phase of said A.C. source, a current transductor comprising two other magnetic cores for which one of said line conductors constitutes the D.C. control windings so that their magnetic saturation varies in accordance with the direct current flowing through said one line conductor, an A.C. winding on each of said two other cores connected with each other in reverse polarity and in series circuit relation, and a circuit connecting said A.C. windings of said current transductor and said ampere winding of said meter in series circuit relation across another phase of said A.C. source, whereby the alternating currents supplied from said A.C. source to the said ampere and milliampere windings of said meter are maintaned in a definite and substantially constant phase displaced relation with respect to each other.

2. A system for measuring and totalizing the power delivered through two line conductors of a direct current power circuit comprising an induction watthour meter having its potential and current windings replaced by an ampere winding and a milliampere winding which are wound to adapt them to the output currents of the two transductors hereinafter specified and a rotatable disc armature connected to a register and adapted to be driven by torque developed thereon by phase displaced currents flowing through said windings, a voltage transductor comprising two closed magnetic cores, a direct current control winding on each core connected with each other in series circuit relation with a current limiting resistance across said two line conductors so as to be responsive to the voltage thereacross, and an A.C. winding on each of said cores connected with each other in reverse polarity and in series circuit relation, a polyphase A.C. supply source, a circuit including a transformer connecting said A.C. windings and said milliampere meter winding in series circuit relation across one phase of said A.C. source to said ampere and milliampere windings magnetic cores disposed in inductive relation with one of said meter are maintained in a definite and substantially varies in accordance with the direct current flow through said one line conductor, a distributed A.C. winding on each of said two other cores connected with each other in reverse polarity and in series circuit relation, and a circuit including a current transformer connecting said distributed windings and said ampere meter winding in series circuit relation across another phase of said A.C. source, whereby the alternating currents supplied from said A.C. source to said ampere and milliampere windings of said meter are maintained in a definite and substantially constant phase displaced relation with respect to each other.

3. The D.C. power recording system according to claim 1, wherein said polyphase A.C. supply source comprises a three phase source providing about 60° phase shift between the alternating currents circulating through said meter windings.

4. A system for measuring and totalizing the power delivered through two line conductors of a direct current power circuit comprising an induction watthour meter having an electromagnetic core with a central upper pole, lateral shunting poles for said upper pole and a pair of laterally spaced lower poles below said upper pole in spaced relation thereto, at least one load or ampere winding replacing the usual potential coil on said upper pole, a milliampere winding replacing the usual current coil on each of said lower poles, a rotatable disc armature connected to a register, said disc armature projecting between said upper and lower poles and adapted to be driven by torque developed thereon by phase displaced currents flowing through said windings, said ampere and milliampere windings being wound to adapt them to the output currents of the two transductors hereinafter specified, a voltage transductor comprising two closed magnetic cores, a D.C. control winding on each of said two cores connected in series with each other and across said two line conductors so as to be responsive to the voltage thereacross, an A.C. winding on each of said two cores connected with each other in reverse polarity and in series circuit relation, a three-phase A.C. supply source, a circuit connecting said A.C. windings and said milliampere meter windings in series circuit relation across one phase of said A.C. source, a current transductor comprising two other magnetic cores, each having a D.C. winding constituted by one of said line conductors so that their magnetic saturation varies in accordance with the direct current flowing through said one line conductor, an A.C. winding on each of said two other cores connected with each other in reverse polarity and in series circuit relation, a circuit connecting said A.C. windings of said current transductor and said ampere winding of said meter in series circuit relation across another phase of said A.C. source, to provide about 60° phase shift between the alternating currents supplied from said A.C. source to the said ampere and milliampere windings of said meter, and a resistor shunted across said ampere winding of said meter to increase the speed of rotation of said disc armature with respect to its speed without said shunting resistor.

References Cited in the file of this patent
UNITED STATES PATENTS

| | | |
|---|---|---|
| 2,656,511 | Specht | Oct. 20, 1953 |
| 2,759,151 | Wagner | Aug. 14, 1956 |

UNITED STATES PATENT OFFICE
CERTIFICATE OF CORRECTION

Patent No. 2,901,701

August 25, 1959

Max J. Kramer et al.

It is hereby certified that error appears in the printed specification of the above numbered patent requiring correction and that the said Letters Patent should read as corrected below.

Column 3, line 9, for "its replaces" read -- it replaces --; column 4, line 15, for "is disc" read -- in disc --; column 5, line 23, strike out "to said ampere and milliampere windings" and insert instead -- , a current transductor comprising two other --; line 25, strike out "meter are maintained in a difinite and substantially" and insert instead -- line conductors so that their magnetic saturation --.

Signed and sealed this 16th day of February 1960.

(SEAL)
Attest:
KARL H. AXLINE
Attesting Officer

ROBERT C. WATSON
Commissioner of Patents